(No Model.)
J. GEDEOHN.
CULTIVATOR.
No. 482,919. Patented Sept. 20, 1892.
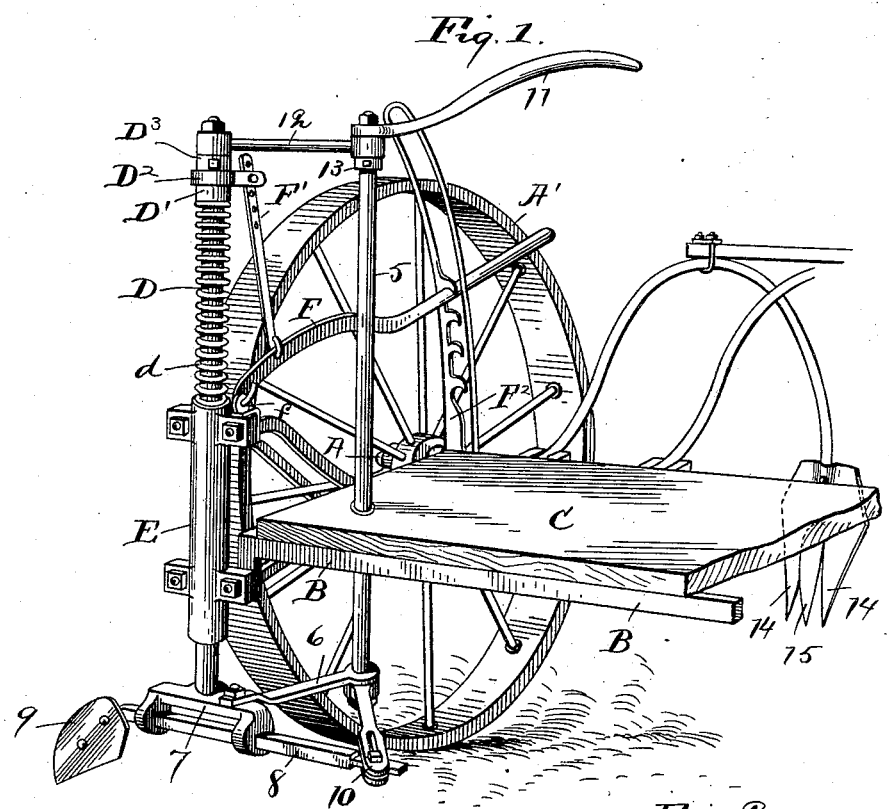
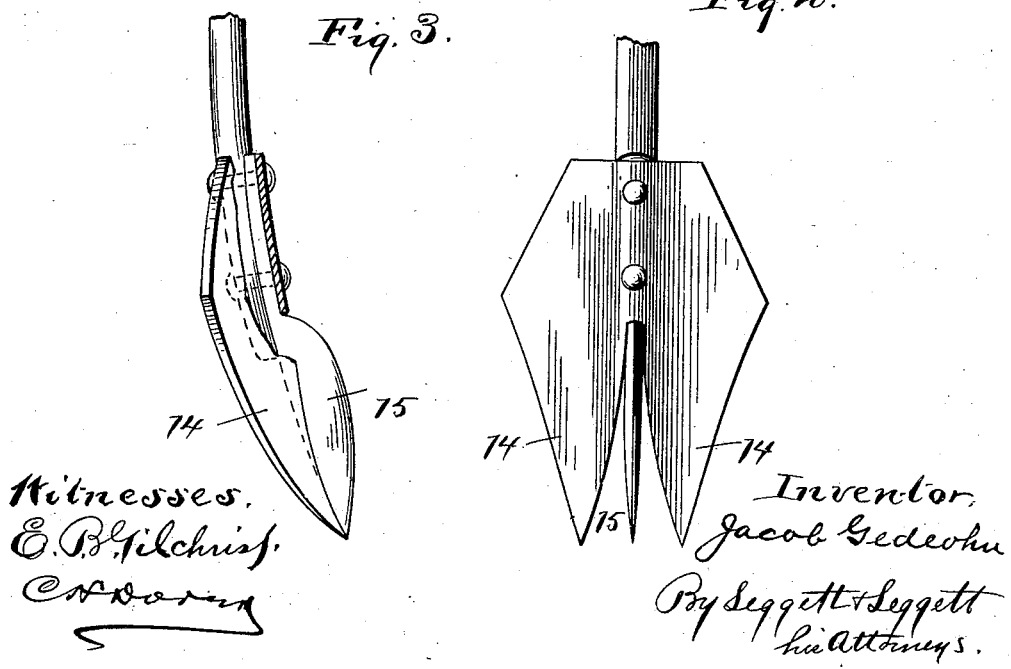
Witnesses.
E. B. Gilchrist.
Inventor,
Jacob Gedeohn
By Leggett & Leggett
his Attorneys.

UNITED STATES PATENT OFFICE.

JACOB GEDEOHN, OF CLEVELAND, OHIO.

CULTIVATOR.

SPECIFICATION forming part of Letters Patent No. 482,919, dated September 20, 1892.

Application filed June 16, 1892. Serial No. 436,895. (No model.)

*To all whom it may concern:*

Be it known that I, JACOB GEDEOHN, of Cleveland, in the county of Cuyahoga and State of Ohio, have invented certain new and useful Improvements in Cultivators; and I do hereby declare the following to be a full, clear, and exact description of the invention, such as will enable others skilled in the art to which it pertains to make and use the same.

My invention relates to improvements in cultivators, more especially to an improvement in the character of cultivator disclosed in United States Letters Patent granted to me September 29, 1891, and numbered 460,240, wherein is shown a "swinging arm mounted on an upright spindle, the free end of the arm bearing a cultivator-blade and the spindle having a hand-lever for swinging the cultivator-blade laterally in and out between, for instance, grape-vines or hills of corn or trees growing in rows, whereby the ground between the vines, hills, or trees of a row may be cultivated at the same time that the ground is being cultivated between the rows." The construction disclosed in the aforesaid patent was objectionable in that too much labor was required on the part of the operator to operate the swinging arm referred to in the foregoing quotation.

One object of my present invention, therefore, is to overcome the objectionable feature to which reference has just been made.

A further object is to improve the construction of the trailing cultivator-blades, whereby the work is not only done more satisfactorily, but the work of the animal in drawing the machine is greatly lessened.

With these objects in view my invention consists in certain features of construction and in combination of parts hereinafter described, and pointed out in the claims.

In the accompanying drawings, Figure 1 is a view in perspective of so much of a cultivator as it is considered necessary to show in order to illustrate my invention. Figs. 2 and 3 are respectively a front and left hand side elevation, partly broken away, of a trailing cultivator-blade.

Referring to the drawings, A represents the axle; A', one of the wheels; B, the framework of the cultivator; C, a platform supported by the frame and axle.

D represents an upright spindle that is journaled in and extends up through the bore of sleeve E, supported in any suitable manner by the framework of the cultivator, and located, as shown, at the forward right-hand corner of the machine.

Spindle D, near the upper end thereof, is provided with an annular shoulder D', between which and sleeve E the spindle has confined upon it a coil-spring $d$, acting in the direction to elevate the spindle. Next above shoulder D' spindle D has loosely mounted thereon a collar $D^2$, that is held from moving endwise of the spindle independently of the latter by means of a collar $D^3$, rigidly mounted on the spindle next above loose collar $D^2$. No claim is made to the construction thus far described, it being substantially the same as that disclosed in the patent aforesaid.

5 represents a second upright spindle, that extends down through platform C and through a guide-arm 6, rigidly secured to a yoke 7, that is rigid with the lower end of spindle D. Yoke 7 affords bearing for a horizontally-reciprocating bar or rod 8, that at its outer end has rigidly secured thereto a cultivator-blade 9 and at its opposite end is operatively connected in any suitable manner with a lateral arm 10 of spindle 5, rod or bar 8 being arranged, preferably, parallel with the axle of the machine—that is, at right angles to the direction of travel of the machine.

Spindle 5 at its upper end is provided with a hand-lever 11, by manipulating which in the one direction or the other rod or bar 8 is reciprocated to move the attached cultivator-blade in or out, as required, to cultivate the ground between the vines, hills, or trees of a row, the position of the cultivator-blade relative to the soil being such that in moving it as just described it will cut through the soil edgewise, and by means of my improved construction it will be observed that said movement of the cultivator-blade is effected with the least labor on the part of the operator.

The entrance of cultivator-blade 9 into the ground to the desired depth is effected by means the same as disclosed in the patent hereinbefore mentioned, the means referred to comprising a lever F, fulcrumed at $f$ and connected by a rod F' with collar $D^2$. Spindle 5 is connected with spindle D by means of a link 12, that rests upon collar D² and upon a collar 13, rigidly mounted on spindle 5. By depressing lever F, therefore, both spindles D and 5 are depressed against the action of spring d, and the recoil of this spring elevates the spindle whenever said lever is released. The mechanism for locking lever F in the desired position is also the same as heretofore, the same comprising a locking-bar F², provided with notches for receiving the lever.

Another important improvement consists in the construction of the trailing cultivating devices. In Figs. 2 and 3 is exhibited more clearly one of my improved trailing cultivating devices, the same comprising a pair of shares 14, preferably integral with each other, and a cutter or tooth 15, located between the two shares, the shares being most remote from the intervening tooth or cutter at their lower extremities, the shares or blades 14 being preferably gradually reduced in width toward their lower extremities, where they terminate in a point, as shown, and being somewhat oblique, as shown, to a line parallel with the direction of travel of the machine. By the construction indicated the soil is not only more thoroughly cultivated, but dragging of the cultivating devices through the soil is avoided, and consequently the strain upon the cultivating devices and supporting rods or bars is greatly reduced and the work of the animal drawing the machine is vastly lessened.

What I claim is—

1. In a cultivator, the combination, with a frame and a spindle supported therein and adapted to reciprocate up and down relative to the machine, said spindle carrying a cultivator-blade, of a rocking spindle also connected with the frame and with the cultivator-blade, whereby when the rock-spindle is rocked the blade is moved, substantially as set forth.

2. The combination, with a suitable frame or support, of a yieldingly-supported yoke connected therewith, a rod having sliding connection with the yoke and carrying a cultivator-tooth, and a rock-spindle connected with the rod and adapted to reciprocate the latter as the spindle is rocked, substantially as set forth.

3. The combination, with a frame or support, of a pair of spindles supported therein, one spindle constructed to reciprocate and having connected therewith a sliding tooth and the other spindle adapted to rock, the latter connected with the sliding tooth and adapted to slide the latter back and forth, substantially as set forth.

4. The combination, with a frame or support, of a pair of spindles connected together and capable of endwise movement and one adapted to rock and a cultivator-tooth having sliding connection with one spindle and the other spindle connected with this tooth, whereby to impart a sliding movement thereto when it is rocked, substantially as set forth.

5. The combination, with a frame or support, a spindle having sliding connection with the frame, said spindle carrying a yoke, a bar sliding in the yoke and carrying a tooth, a spring for yieldingly sustaining and normally elevating the spindle, and a lever for adjusting this spindle and locking it in position, of a rock-spindle having connection with the sliding spindle, said rock-spindle connected with the sliding bar, and a lever for rocking this spindle, substantially as set forth.

6. Cultivating devices comprising a pair of shares slightly separated or divided at their lower ends and a cutter having a curved nearly-vertical forward edge located between these shares, the extreme lower ends of the teeth curving or projecting away from the blade, substantially as set forth.

In testimony whereof I sign this specification, in the presence of two witnesses, this 27th day of May, 1892.

JACOB GEDEOHN.

Witnesses:
C. H. DORER,
WARD HOOVER.